United States Patent
McLaughlin et al.

(10) Patent No.: US 9,959,172 B2
(45) Date of Patent: May 1, 2018

(54) DATA PROCESSING DEVICE AND METHOD OF CONDUCTING A LOGIC TEST IN A DATA PROCESSING DEVICE

(71) Applicant: FREESCALE SEMICONDUCTOR, INC., Austin, TX (US)

(72) Inventors: Steven McLaughlin, Dumbarton (GB); Alan Devine, Paisley (GB); Alistair James Gorman, Broughty Ferry/Dundee (GB); Alistair Paul Roberston, Glasgow (GB)

(73) Assignee: NXP USA, Inc., Austin, TX (US)

( * ) Notice: Subject to any disclaimer, the term of this patent is extended or adjusted under 35 U.S.C. 154(b) by 122 days.

(21) Appl. No.: 15/035,017

(22) PCT Filed: Nov. 25, 2013

(86) PCT No.: PCT/IB2013/060383
§ 371 (c)(1),
(2) Date: May 6, 2016

(87) PCT Pub. No.: WO2015/075509
PCT Pub. Date: May 28, 2015

(65) Prior Publication Data
US 2016/0275008 A1      Sep. 22, 2016

(51) Int. Cl.
*G06F 11/14*   (2006.01)
*G06F 11/22*   (2006.01)
*G06F 9/44*    (2018.01)

(52) U.S. Cl.
CPC ........ *G06F 11/1417* (2013.01); *G06F 9/4401* (2013.01); *G06F 11/2236* (2013.01); *G06F 11/2284* (2013.01)

(58) Field of Classification Search
CPC ............... G06F 9/4401; G06F 11/1417; G06F 11/1438; G06F 11/1441; G06F 11/2236; G06F 11/2273–11/2284; G06F 11/27
USPC ..................... 713/1, 2; 714/30, 31
See application file for complete search history.

(56) References Cited

U.S. PATENT DOCUMENTS

| | | |
|---|---|---|
| 5,383,195 A | 1/1995 | Spence et al. |
| 5,912,901 A | 6/1999 | Adams et al. |
| 5,974,546 A * | 10/1999 | Anderson ........... G06F 11/2284 713/2 |

(Continued)

OTHER PUBLICATIONS

International Search Report for application No. PCT/IB2013/060383, dated Aug. 19, 2014, 11 pages.

*Primary Examiner* — Joseph R Kudirka

(57) ABSTRACT

A data processing device, comprising a processing unit and a test control unit connected to the processing unit, is described. The processing unit and the test control unit are arranged to: start a logic test of the processing unit; detect a test abort event; and, in response to the test abort event, perform an event response action which comprises aborting the logic test and booting the processing unit, said booting including executing an event handling routine. The event response action may comprise setting a reset vector to an address of the event handling routine. System availability may thus be improved. In particular, the delay between capturing an asynchronous signal and responding to it may be reduced. The test abort event may, for example, be an asynchronous event having certain pre-defined characteristics.

A method of operating a data processing device is also described.

19 Claims, 3 Drawing Sheets

(56) References Cited

U.S. PATENT DOCUMENTS

| | | | |
|---|---|---|---|
| 6,415,406 B1 | 7/2002 | Kaiser et al. | |
| 6,467,054 B1 | 10/2002 | Lenny | |
| 6,760,873 B1 | 7/2004 | Hao et al. | |
| 6,807,643 B2 * | 10/2004 | Eckardt | G06F 11/2284 |
| | | | 713/2 |
| 7,730,293 B2 * | 6/2010 | Owhadi | G11B 5/455 |
| | | | 713/1 |
| 8,006,144 B2 * | 8/2011 | Hughes | G11C 29/16 |
| | | | 714/718 |
| 8,335,881 B2 | 12/2012 | Welguisz et al. | |
| 8,499,208 B2 | 7/2013 | Dieffenderfer et al. | |
| 9,092,404 B2 * | 7/2015 | Singh | G06F 11/2284 |
| 2008/0010527 A1 | 1/2008 | Lu | |
| 2008/0109691 A1 | 5/2008 | Dieffenderfer et al. | |
| 2008/0155332 A1 | 6/2008 | Landers et al. | |
| 2012/0226942 A1 * | 9/2012 | Gangasani | G06F 11/27 |
| | | | 714/30 |

* cited by examiner

DATA PROCESSING DEVICE AND METHOD OF CONDUCTING A LOGIC TEST IN A DATA PROCESSING DEVICE

FIELD OF THE INVENTION

This invention relates to a data processing device and to a method of operating a data processing device.

BACKGROUND OF THE INVENTION

It is known to provide data processing devices with additional circuitry for enabling the data processing device to test its own integrity. Such a test is known as a built in self test (BIST). A data processing device may be arranged to perform a BIST a limited number of times, e.g., prior to handing the data processing device over to a customer, or repeatedly, e.g., many times during the entire life time of the data processing device. A data processing device that is operated for safety critical applications, e.g., in a motorized vehicle such as a car or truck, may be required to perform a BIST repeatedly at prescribed intervals. For example, a BIST may be performed immediately after powering on the device and then once every twelve hours, for example. When the device is carrying out a BIST, the functionality of the device may be reduced. The duration of the interval between two subsequent BISTs may therefore be a compromise between the desire of monitoring the integrity of the device and the desire to maximise the time during which the device is fully operational.

A data processing device may comprise data storage circuitry and data processing circuitry. A test of the data storage circuitry performed by the data processing device is known as a memory built in self test (MBIST). A test of the processing circuitry performed by the data processing device is known as a logic built in self test (LBIST). An LBIST may affect the functionality of the data processing device more severely than an MBIST. In fact, when running an LBIST, the processing circuitry may be unavailable for any other purpose.

SUMMARY OF THE INVENTION

The present invention provides a data processing device and a method of operating a data processing device as described in the accompanying claims.

Specific embodiments of the invention are set forth in the dependent claims.

These and other aspects of the invention will be apparent from and elucidated with reference to the embodiments described hereinafter.

DETAILED DESCRIPTION OF THE PREFERRED EMBODIMENTS

Because the apparatus implementing the present invention is, for the most part, composed of electronic components and circuits known to those skilled in the art, circuit details will not be explained in any greater extent than that considered necessary for the understanding and appreciation of the underlying concepts of the present invention and in order not to obfuscate or distract from the teachings of the present invention.

Figure 1:
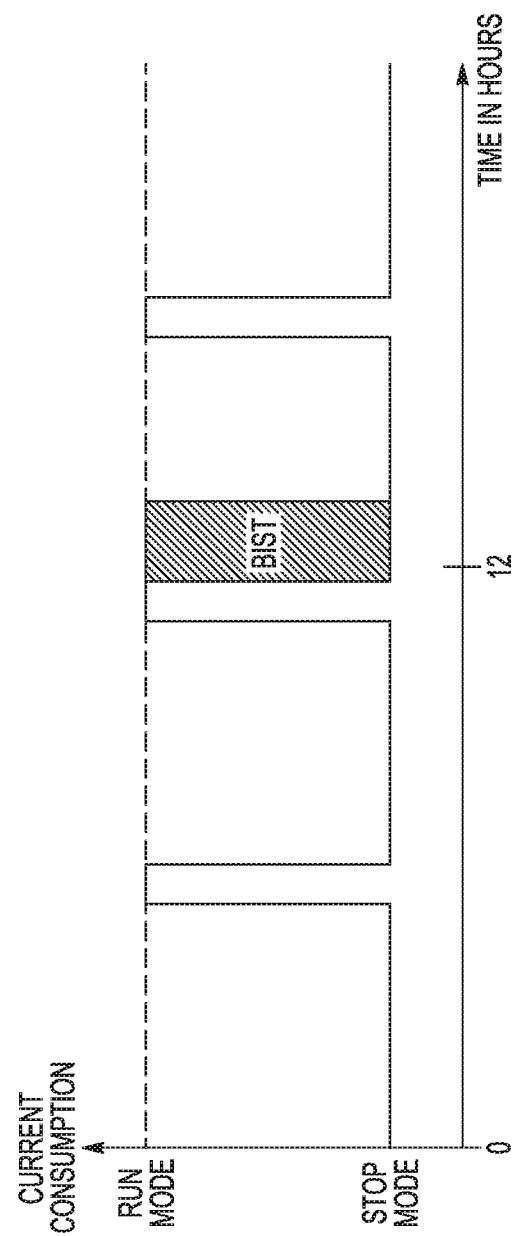
FIG. 1 shows a graph illustrating the current consumption of a data processing device versus time in accordance with an example of a power saving scheme.

FIG. 1 schematically illustrates an example of an operating scheme of a data processing device with a run mode and a low power mode. The run mode may be a normal operating mode. The low power mode may be a mode in which one or more domains or units of the data processing device are powered off to save energy. Schematically plotted in the Figure is the electrical power ("current consumption") as a function of time ("time in hours"). In the example, the data processing device is in the low power mode during the intervals 0 to 5 hours, 6 to 11 hours, 13 to 17 hours and 18 to 24 hours. In the remaining intermediate intervals of 5 to 6 hours, 11 to 13 hours and 17 to 18 hours, the data processing device is in the run mode. The data processing device may, for example, be arranged to wake up every six hours to perform, for example, a certain monitoring function. A BIST may, for example, be performed prior to each transition from the run mode to the low power mode provided that at least twelve hours have lapsed since the preceding BIST. It is emphasized that this is only an example and that a variety of BIST scheduling schemes are known. Also, the time scales may be significantly different from the ones shown here. In the example, the BIST is performed in the run mode to ensure that the components to be tested are operational. A problem may occur in that the data processing device may be unable to respond promptly to external events, e.g., pin transitions, which may occur while the data processing device is carrying out the BIST.

An example of a data processing device 10 and an example of a method of operating the data processing device 10 is described with reference to FIGS. 2 and 3.

The data processing device 10 comprises a processing unit 12 and a test control unit 16 connected to the processing unit. The data processing device may, for example, be a micro controller (MCU), a digital signal processor (DSP) or other type of microprocessor such as a general purpose microprocessor. The processing unit may comprise one or more processor cores. The data processing device may, for example, be implemented as a system on chip (SOC) with the shown elements (and optionally additional units) implemented in a single integrated circuit.

The data processing device may be arranged to perform a normal boot action in response to a normal boot signal, e.g., in response to a power-on reset signal. Booting is a process carried out by an information processing device to reach an operating state, i.e., a state in which it is fully operational, and, notably, capable of responding to external events with an acceptable latency. Booting may comprise, for example, loading an operating system, loading drivers, and setting memory elements to predefined initial states. The normal boot action may notably comprise normal booting of the processing unit. This may comprise fully initializing the data processing device before the data processing device becomes able to respond to external events. The processing unit and the test control unit may be arranged to start a logic test of the processing, that is, to initiate a LBIST. The processing unit and the test control unit may further be arranged to detect a test abort event, and, in response to the test abort event, perform an event response action which comprises aborting the logic test and which further comprises dedicated booting of the processing unit. A test abort event may, for example, be any asynchronous signal having certain pre-defined characteristics. Dedicated booting of the processing unit may comprise executing an event handling routine (also referred to as a handler) whereas normal booting does not necessarily comprise executing the event handling routine. The data processing device may thus be able to respond rapidly to the test abort event. System availability may thus be improved. In particular, the delay between collecting an asynchronous signal and responding to it may be reduced. The data processing device may therefore lend itself particularly well to safety critical applications. The event handling routine may, for example, be performed at an early stage of the boot process, e.g., prior to initializing one or more peripheral units integrated in the data processing device. The event handling routine may, for example, be provided in the form of executable instructions residing in a memory unit of the data processing device. The memory unit may be programmable. A user may thus be enabled to program or reprogram the event handling routine to suit his or her specific needs. The boot process may, for instance, be triggered by generating a power on reset (POR) signal in response to the test abort event.

The event response action may further comprise rebooting the processing unit without executing the event handling routine. The processing unit may, for example, be rebooted in response to terminating execution of the event handling routine. In other words, a first boot process triggered by the test abort event and including the event handling routine may be followed by a second boot process, i.e., said rebooting, which does not include execution of the event handling routine. The second boot process may notably be a default boot process, that is, a boot process carried out by default by the data processing device in response to, e.g., a power on reset signal. The first boot process may comprise initializing the data processing device only partially. Code defining the test abort boot process may thus be kept minimal, avoiding redundancy with code defining the normal boot process. More specifically, the test abort boot process may be arranged not to initialize one or more components of the data processing device that are not required for handling the test abort event.

There may be different kinds of test abort events. Examples of test abort events may include pin transitions, power glitches (e.g., an overvoltage on a pin), user switches (e.g., via an input/output unit), signals received via communication bus receiver (Rx) lines, and messages transmitted and received in accordance with a communication protocol such as CAN, Ethernet, or LIN. For each kind of test abort event, a dedicated handler may be called upon and executed.

From the above it is understood that the test control unit may have to remain at least partly operational during the logic test of the processing unit. It may therefore be advantageous to exclude the test control unit from the logic test. In other words, the test control unit may be exempt from the logic test of the processing unit. The test control unit may, for example, comprise triple voting stateful elements, thus avoiding the need for subjecting the test control unit to a logic test. The triple voting stateful elements may, for example, include triple voting flip flops or triple voting registers. In one example, the entire test control unit is implemented as triple voting logic.

The data processing device may comprise an input unit connected or connectable to the test control unit. The test abort event may comprise a transition at the input unit. The input unit may, for example, comprise one or more input pins or other kinds of terminals. In one example, any transition at the input unit constitutes a test abort event. In another example, a transition at the input unit qualifies as a test abort event only in conjunction with one or more additional conditions. For example, a transition may be considered a test abort event only when a certain flag within the data processing device is set. In other words, not every transition at the input unit is necessarily a test abort event. In one example, transitions at the input unit are classified as safety critical and not safety critical, and only safety critical transitions are processed as test abort events.

The processing unit may have a run mode and a low power mode. As mentioned above, the data processing device may be arranged to conduct the logic test with the processing unit operating in the run mode.

The data processing device may comprise a wake-up unit connected or connectable to the input unit. The wake-up unit may be arranged to wake the processing unit up in response to a wake-up event when the processing unit is in the low power mode. A wake-up event may, for example, comprise or consist in a transition at the input unit.

Operating the data processing device may thus comprise: starting a logic test of the processing unit, detecting a test abort event, and, in response to the test abort event, performing an event response action which comprises aborting the logic test and partially resetting the data processing device, then operating the processing unit to execute an event handling routine. The operation of partially resetting the data processing device may notably include resetting the processing unit. In one example, the event handling routine is arranged to process different test abort events differently. In another example, the data processing device provides two or more different event handling routines and selects the event handling routine to be executed in dependence of the test abort event, or in dependence of a type of the test abort event.

Figure 2:
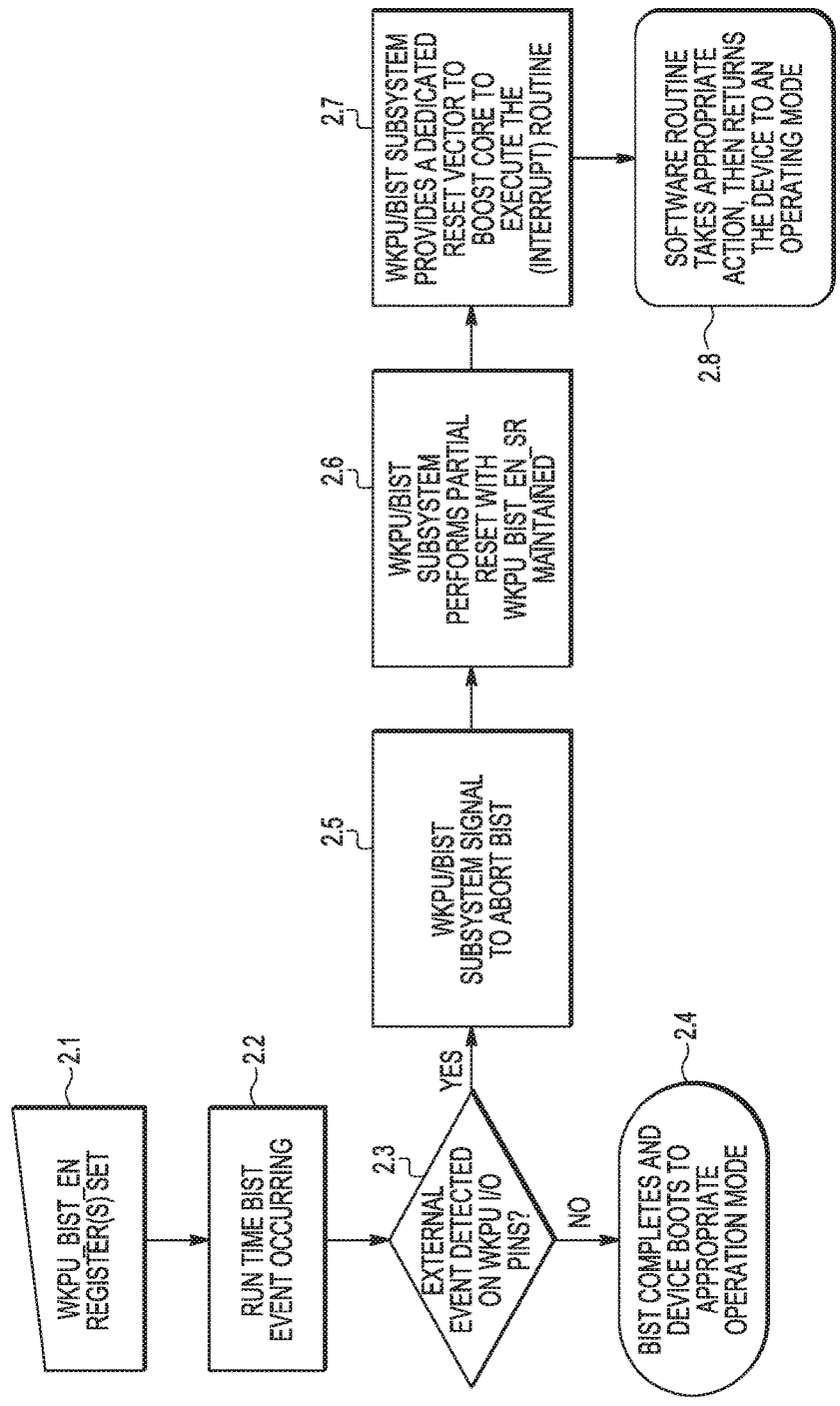
FIG. 2 shows a flow chart of an example of an embodiment of a method of operating a data processing device.
Figure 3:
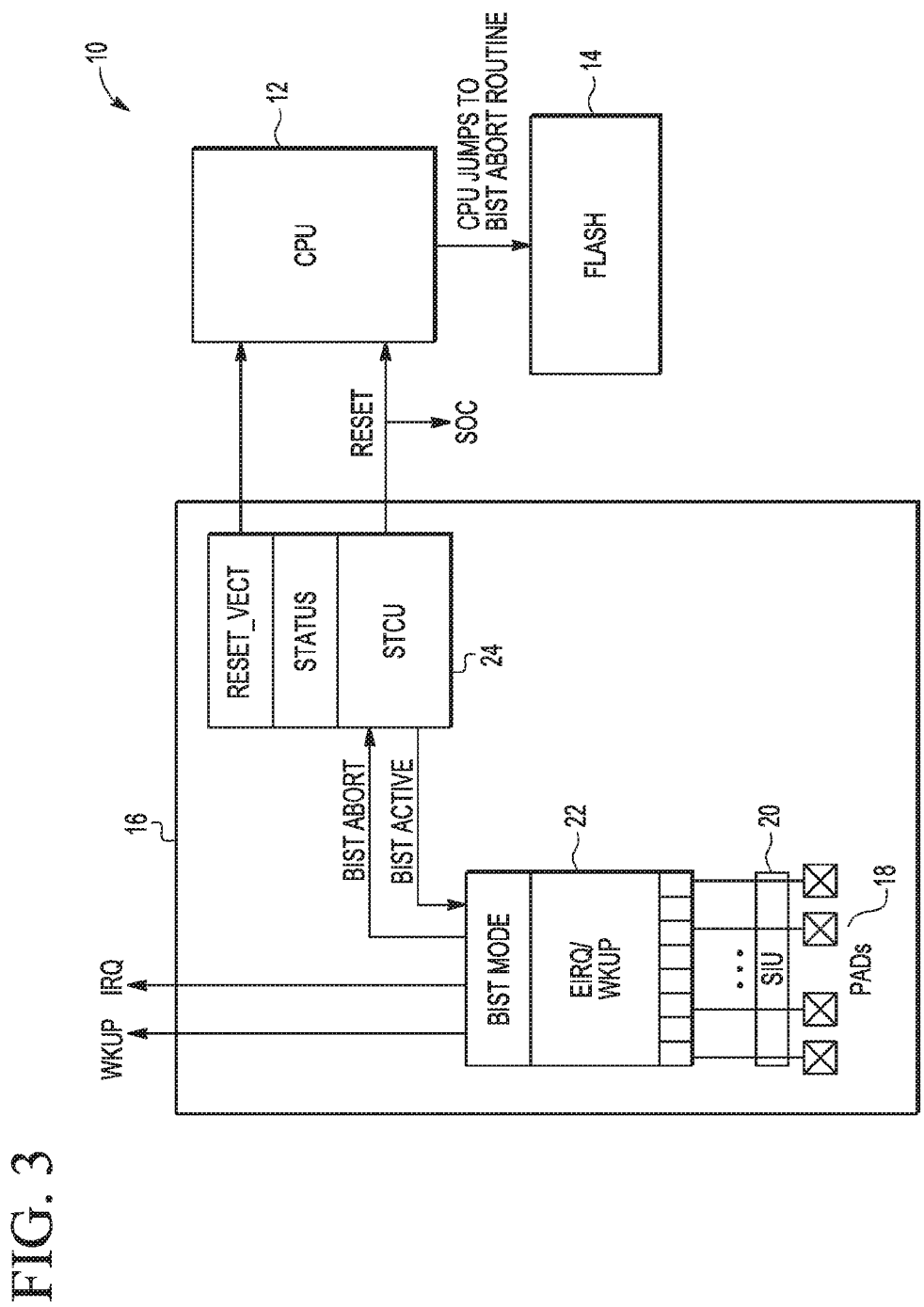
FIG. 3 schematically shows an example of an embodiment of a data processing device.

Referring now more specifically to FIG. 2, the flow chart shown therein schematically illustrates an example of a method of operating a data processing device, e.g., the data processing 10 shown in FIG. 3. The method may start, for example, with enabling self-testing, e.g., by setting an appropriate flag or register (Box 2.1). In another example, self-testing may be constantly enabled. This does not mean that the data processing device will incessantly perform a self-test; it rather means that the data processing device is constantly configured to carry out a self-test in response to an appropriate self-test triggering event. In the example, a BIST event occurs at run time at a certain scheduled or unscheduled moment (Box 2.2). The data processing device may thus be prompted to carry out the self-test. More specifically, normal operation of the processing unit of the device may stop and the test control unit may conduct a test of the processing unit, i.e., conduct a logic BIST. If no test abort event is detected (Box 2.3), the test control unit may complete the test of the processing unit and the data processing device may then boot to an appropriate operation mode (Box 2.4), e.g., to a run mode or to a low power mode.

Note that the data processing device does not necessarily have different operating modes. In one example, the data processing device may lack a low power mode and boot to the run mode when the test of the processing unit has been completed. In another example, the data processing device switches itself off upon completion of the self-test.

If, however, a BIST abort event is detected (Box 2.3), the test control unit prompts the data processing device to abort the logic test (Box 2.5). The test control unit may then perform a partial reset of the data processing device (Box 2.6), maintaining, however, at least some data describing the test abort event so as to enable the data processing device to take an appropriate action and respond to the test abort event. Test abort event data, i.e., information about the test abort event may, for example, be provided by one or more status registers or other kinds of memory elements arranged to conserve their states during the partial reset of the data processing device. The partial reset of the data processing device may include a full reset of the processing unit. The one or more registers or other kinds of memory elements for providing information about the test abort event may be located outside the processing unit.

The processing unit may then be booted to execute an event handling routine (Box 2.7). This boot operation may differ from a normal boot operation carried out by the data processing device by default in the event of, e.g., a power on reset. Notably, the boot process triggered by the test abort event may enable the processing unit to respond earlier, i.e., with less delay, to the test abort event as compared to an alternative implementation, e.g., as compared to one in which the test abort event triggers a power on reset boot process which does not include the event handling routine. In one example, the test control unit provides a dedicated reset vector that points to the event handling routine. The event handling routine may thus be executed immediately in response to resetting the processing unit. The event handling routine may then take an appropriate action, e.g., in dependence of information about the test abort event that was detected in Box 2.3. The event handling routine may then return the data processing device to an operating mode, e.g., to a run mode or to a low power mode.

Potentially, a situation may arise in which the data processing device repeatedly starts and aborts a logic test of the processing unit due to a series of test abort events. It may thus happen that every logic test is aborted due to test abort events. This may pose a safety risk. In view of this, the test control unit may be arranged to generate an error signal in response to detecting that a period of predefined length has passed without completing a logic test. A user of the data processing device or a monitoring unit may thus be informed that there may be a safety risk.

FIG. 3 shows an example of a data processing device 10. The data processing device 10 may also be referred to herein as the system 10. In the example, the data processing device 10 is implemented as a system on chip (SOC) comprising a processing unit 12, a memory unit 14, and a test control unit 16. These units may be suitably interconnected among each other. The data processing device 10 may comprise further functional units indicated as "SOC" in the Figure. The processing unit 12 may be of a type commonly referred to as a central processing unit (CPU). It may comprise one or more, e.g. 2, 4, 8, 16, 32 etc, processor cores. The memory unit 14 may, for example, comprise an on-chip flash memory.

The test control unit 16 may be arranged to conduct a logic test of the processing unit 12 by providing the processing unit 12 with suitable test control signals. The data processing device 10 may further comprise an input unit 18 comprising, for example, one or more input terminals, e.g., input pins or pads. In FIG. 3, the input unit 18 is shown as a part of the test control unit 16. However, the input unit 18 may be implemented as a unit separate from the test control unit 16. In the example, the input unit 18 is connected or connectable to the rest of the device 10 via an input-output (I/O) control unit 20.

In the example of FIG. 3, a wake-up unit 22 is integrated in the test control unit 16. In another example (not shown), the test control unit 16 and the wake-up unit 22 may be implemented as separate units, or the test control unit 16 may be integrated in the wake-up unit 22. The wake-up unit 22 may be arranged to wake the data processing device 10 up in response to a wake-up event, e.g., a transition at the input unit 18.

The test control unit 16 may further comprise a test abort unit 24. The test abort unit 24 may, for example, be arranged to reset the processing unit 12 in response to a test abort event detected by, e.g., the wake-up unit 22 in response to, e.g., a transition at the input unit 18. The test abort unit 24 may further be arranged to provide a dedicated reset vector to the processing unit 12. For example, the processing unit 12 may comprise a boot register for containing the address of a first instruction to be carried out in response to resetting the processing unit 12. Thus, when the processing unit 12 is reset, it will read the address stored in the boot register and execute the instruction stored at that address. In other words, the boot register may contain a jump instruction executed by the processing unit 12 in response to a reset of the processing unit 12. For example, the test abort unit 24, in response to a test abort event, may write the address of the beginning of the event handling routine to the boot register, thus forcing the processing unit 12 to execute the event handling routine in response to the reset triggered by the test abort event. The test abort unit 24 may further be arranged to reset the boot register to its original state when the processing unit 12 has started executing the event handling routine.

In one example, a car is powered on and remains stationary for a while. This may offer an opportunity to perform an LBIST of, e.g., a body control unit. In the event of a second car hitting the first car, an impact sensor of the first car may send a CAN message to the main body controller in order to inflate one or more airbags. The CAN message may then be received and a dedicated air bag deploy subroutine may be executed with minimal latency.

In another example, an external watchdog timer signal is applied on the MCU pins. In this case, the LBIST may be aborted and the normal boot process may be called, allowing the system to start over again.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the specific examples described. For example, the connections may be any type of connection suitable to transfer signals from or to the respective nodes, units or devices, for example via intermediate devices. Accordingly, unless implied or stated otherwise the connections may for example be direct connections or indirect connections.

Likewise, if the logically true state is a logic level one, the logically false state is a logic level zero. And if the logically true state is a logic level zero, the logically false state is a logic level one.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, the memory 14 may be located on a same integrated circuit as the processing unit 12 or on a separate integrated circuit or located within another peripheral or slave discretely separate from other elements of system 10. The Input unit 18 and I/O circuitry 16 may also be located on separate integrated circuits or devices. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the above described operations merely illustrative. Multiple operations may be combined into a single operation, and/or a single operation may be distributed in additional operations. Moreover, alternative embodiments may include multiple instances of a particular operation, and the order of operations may be altered in various other embodiments.

In one embodiment, device 10 is used a computer system such as an embedded computing system for a car or other motorized vehicle. Other embodiments may include different types of computer systems. Computer systems are information handling systems which can be designed to give independent computing power to one or more users and process information according to a program and produce resultant output information via I/O devices. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing device, associated external memory and a number of input/output (I/O) devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data processing device, comprising a processing unit and a test control unit connected to the processing unit, wherein the processing unit and the test control unit are arranged to:
   in response to a normal boot signal, perform a normal boot action which comprises normal booting of the processing unit;
   start a logic test of the processing unit;
   detect a test abort event;
   in response to the test abort event, perform an event response action which comprises aborting the logic test and dedicated booting of the processing unit,
   wherein said dedicated booting includes executing an event handling routine and said normal booting of the processing unit does not include executing the event handling routine.

2. The data processing device of claim 1, wherein said event response action further comprises, after said operating the processing unit executing the event handling routine:
   rebooting the processing unit without executing the event handling routine.

3. The data processing device of claim 1, wherein said normal booting comprises fully initializing the data processing device and wherein said dedicated booting comprises initializing the data processing device only partially.

4. The data processing device of claim 1, wherein the processing unit has a reset vector and said event response action comprises:
   setting the reset vector to an address of the event handling routine.

5. The data processing device of claim 1, wherein said test control unit comprises triple-voting stateful elements.

6. The data processing device of claim 1, comprising an input unit connected or connectable to the test control unit, wherein the test abort event comprises a transition at the input unit.

7. The data processing device of claim 6, wherein the processing unit has a run mode and a low power mode.

8. The data processing device of claim 7, arranged to conduct said logic test with the processing unit operating in the run mode.

9. The data processing device of claim 7, comprising a wake-up unit connected or connectable to the input unit, wherein the wake-up unit is arranged to wake the processing unit up in response to a wake-up event when the processing unit is in the low power mode.

10. The data processing device of claim 1, arranged to reboot in response to completing the logic test, without executing the event handling routine.

11. The data processing device of claim 1, wherein the test control unit is arranged to generate an error signal in response to detecting that a period of predefined length has passed without completing a logic test of the processing unit.

12. The data processing device of claim 1, wherein the processing unit comprises one or more processor cores.

13. The data processing device of claim 1, implemented as a system-on-chip.

14. A method of operating a data processing device, the data processing device comprising a processing unit, wherein the method comprises:
   in response to a normal boot signal, performing a normal boot action which comprises normal booting of the processing unit;
   starting a logic test of the processing unit;
   detecting a test abort event;
   in response to the test abort event, performing an event response action which comprises aborting the logic test and which further comprises dedicated booting of the processing unit,
   wherein said dedicated booting of the processing unit includes executing an event handling routine and said normal booting of the processing unit does not include executing the event handling routine.

15. The method of claim 14, wherein said event response action further comprises, after said operating the processing unit executing the event handling routine:
   rebooting the processing unit without executing the event handling routine.

16. The method of claim 14, wherein said normal booting comprises fully initializing the data processing device and wherein said dedicated booting comprises initializing the data processing device only partially.

17. The method of claim 14, wherein the processing unit has a reset vector and said event response action comprises:
   setting the reset vector to an address of the event handling routine.

18. The method of claim 14, wherein said test control unit comprises triple-voting stateful elements.

19. The method of claim 14, comprising an input unit-connected or connectable to the test control unit, wherein the test abort event comprises a transition at the input unit.

* * * * *